United States Patent [19]

Schlosser et al.

[11] Patent Number: 5,171,192
[45] Date of Patent: Dec. 15, 1992

[54] LOCKING DIFFERENTIAL

[75] Inventors: Kraig J. Schlosser, Auburn; Howard W. Reaser, Columbia City, both of Ind.

[73] Assignee: Dana Corporation, Toledo, Ohio

[21] Appl. No.: 638,516

[22] Filed: Dec. 31, 1990

[51] Int. Cl.$^5$ .............................................. F16H 1/44
[52] U.S. Cl. .................... 475/237; 475/230; 475/231
[58] Field of Search ................... 475/230, 231, 237

[56] References Cited

U.S. PATENT DOCUMENTS

| | | | |
|---|---|---|---|
| 306,403 | 10/1984 | Kelly et al. | 475/231 |
| 677,771 | 7/1901 | Birdsall | 475/231 |
| 964,387 | 7/1910 | Burnam | 475/231 |
| 968,224 | 8/1910 | Wolf | 475/231 |
| 1,018,553 | 2/1912 | Cullman | 475/231 |
| 1,173,442 | 2/1916 | Kuhn | 475/231 |
| 1,193,017 | 8/1916 | Higinbotham | 475/231 |
| 1,212,795 | 1/1917 | Mayer et al. | 475/231 |
| 1,243,720 | 10/1917 | Eidson et al. | 475/231 |
| 1,447,116 | 2/1923 | Baird et al. | 475/231 |
| 1,723,901 | 8/1929 | Todd | 475/231 |
| 1,786,492 | 12/1930 | Hustvet | 475/231 |
| 3,105,394 | 10/1963 | Salzmann | 475/231 |
| 3,306,130 | 2/1967 | Salzmann | 475/231 |
| 3,362,258 | 1/1968 | Thornton | 475/231 |
| 3,448,636 | 6/1969 | Roper et al. | 475/231 X |
| 3,732,752 | 5/1973 | Louckes et al. | 475/231 |
| 4,043,224 | 8/1977 | Quick | 475/231 |
| 4,555,962 | 12/1985 | Bucarelli | 475/231 |

FOREIGN PATENT DOCUMENTS

| | | |
|---|---|---|
| 390440 | 10/1990 | European Pat. Off. . |
| 2633688 | 1/1990 | France ............... 475/231 |
| 1382926 | 2/1975 | United Kingdom . |

*Primary Examiner*—Leslie A. Braun
*Assistant Examiner*—William O. Trousdell
*Attorney, Agent, or Firm*—MacMillan, Sobanski & Todd

[57] ABSTRACT

A locking differential includes a case which is rotatably driven by a power source. A cross shaft is mounted within the case for rotation therewith. A pair of pinion gears are rotatably mounted on the ends of the cross shaft. The pinion gears mesh with side gears splined onto respect axle shafts. Thus, when the case is rotated, torque is transmitted through the cross shaft, the pinion gears, and the side gears to the axle shafts. A locking collar is journalled on one of the side gears for axial movement between locked and unlocked positions. In the locked position, the locking collar is connected to the side gear for rotation therewith. In the unlocked position, the side gear is free to rotate relative to the locking collar. The locking collar is connected to a shifting collar by a plurality of spoke portions which extend through respective slots formed through the case. Bearing means are provided in each of the slots for engaging and guiding the axial movement of the shifting and locking collars.

11 Claims, 2 Drawing Sheets

LOCKING DIFFERENTIAL

BACKGROUND OF THE INVENTION

This invention relates in general to differential gear mechanisms and in particular to a differential which is selectively lockable so as to prevent differentiation.

Differential gear mechanisms, commonly referred to simply as differentials, are well known devices which are frequently used in the drive trains of most vehicles. The differential is usually connected between an input driving shaft (typically a drive shaft from the vehicle engine) and a pair of output driven shafts (typically a pair of axle shafts connected to the vehicle wheels). The differential distributes torque from the input shaft equally to the two output shafts, while permitting such output shafts to rotate at different speeds under certain conditions. As a result, torque is supplied to both wheels of the vehicle as it negotiates a turn, while permitting the outside wheel to turn faster than the inside wheel.

In a conventional open differential, the movements of the various internal components of the differential are not restricted in any significant fashion. Thus, the differential functions in the desirable manner described above under most circumstances. However, when one of the wheels of the vehicle loses traction with the ground, such as can occur on wet or icy surfaces, the differential will reduce the amount of torque supplied to the other wheel. Consequently, the vehicle can become immobilized.

To prevent this from occurring, some differentials are provided with an operator actuated locking device. When actuated, the locking device completely restricts the movement of the internal components of the differential, thereby providing full torque from the engine to both wheels. At the same time, however, both wheels are driven at exactly the same speed. Thus, locked differentials are not well suited for use on non-slippery surfaces Many different devices are known for selectively locking the differential for operation in this manner.

SUMMARY OF THE INVENTION

This invention relates to an improved structure for a locking differential. The differential includes a case which is rotatably driven by a power source. A cross shaft is mounted within the case for rotation therewith. A pair of pinion gears are rotatably mounted on the ends of the cross shaft. The pinion gears mesh with side gears splined onto respect axle shafts. Thus, when the case is rotated, torque is transmitted through the cross shaft, the pinion gears, and the side gears to the axle shafts. A locking collar is journalled on one of the side gears for axial movement between locked and unlocked positions. In the locked position, the locking collar is connected to the side gear for rotation therewith. In the unlocked position, the side gear is free to rotate relative to the locking collar. The locking collar is connected to a shifting collar by a plurality of spoke portions which extend through respective slots formed through the case. Bearing means are provided in each of the slots for engaging and guiding the axial movement of the shifting and locking collars.

It is an object of this invention to provide an improved structure for a selectively lockable differential.

It is another object of this invention to provide such a lockable differential with bearing means for engaging and guiding the axial movement of shifting and locking collars.

Other objects and advantages of this invention will become apparent to those skilled in the art from the following detailed description of the preferred embodiments, when read in light of the following drawings.

DETAILED DESCRIPTION OF THE PREFERRED EMBODIMENTS

Figure 1:
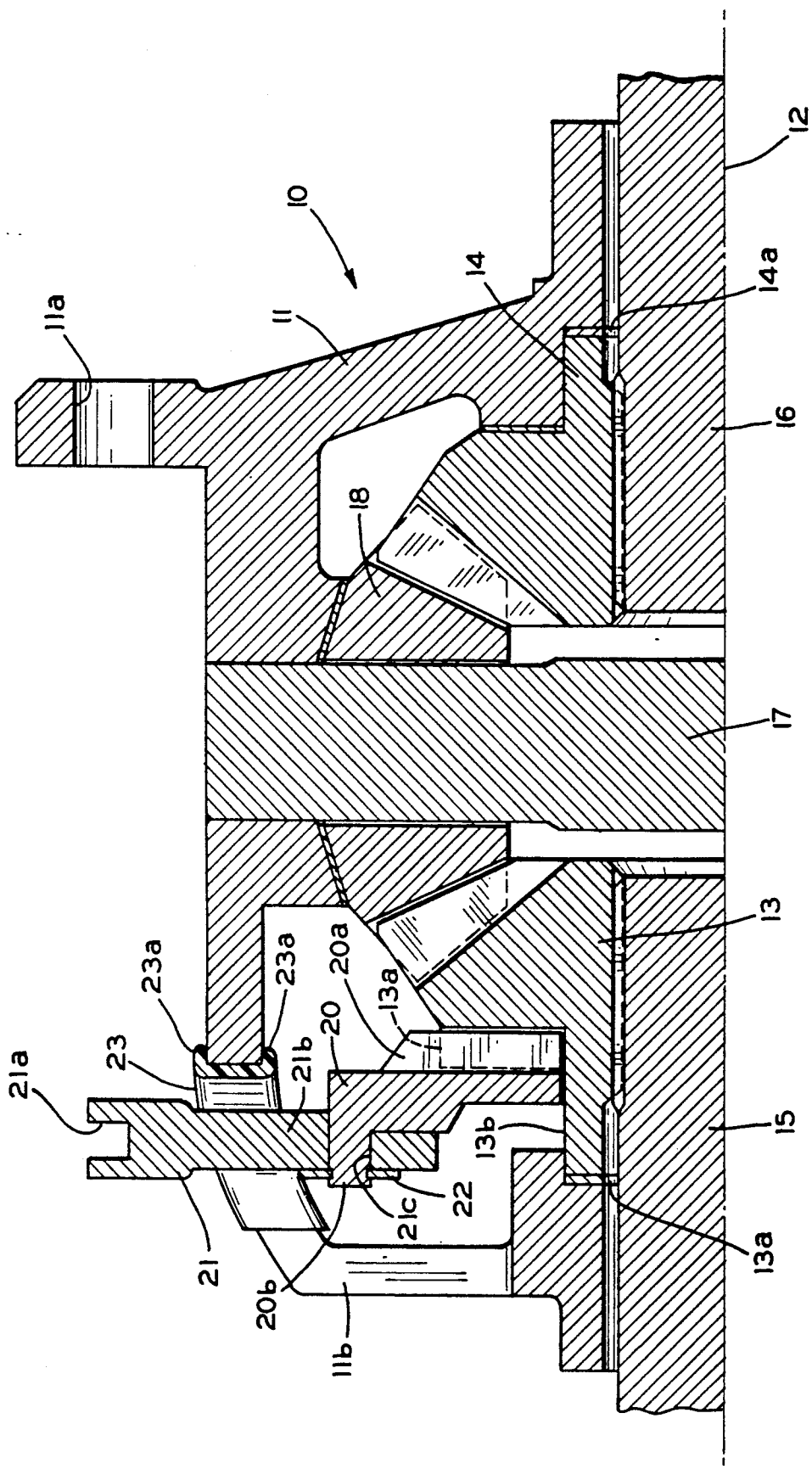
FIG. 1 is a sectional elevational view of a portion of a selectivel lockable differential in accordance with this invention.
Figure 2:
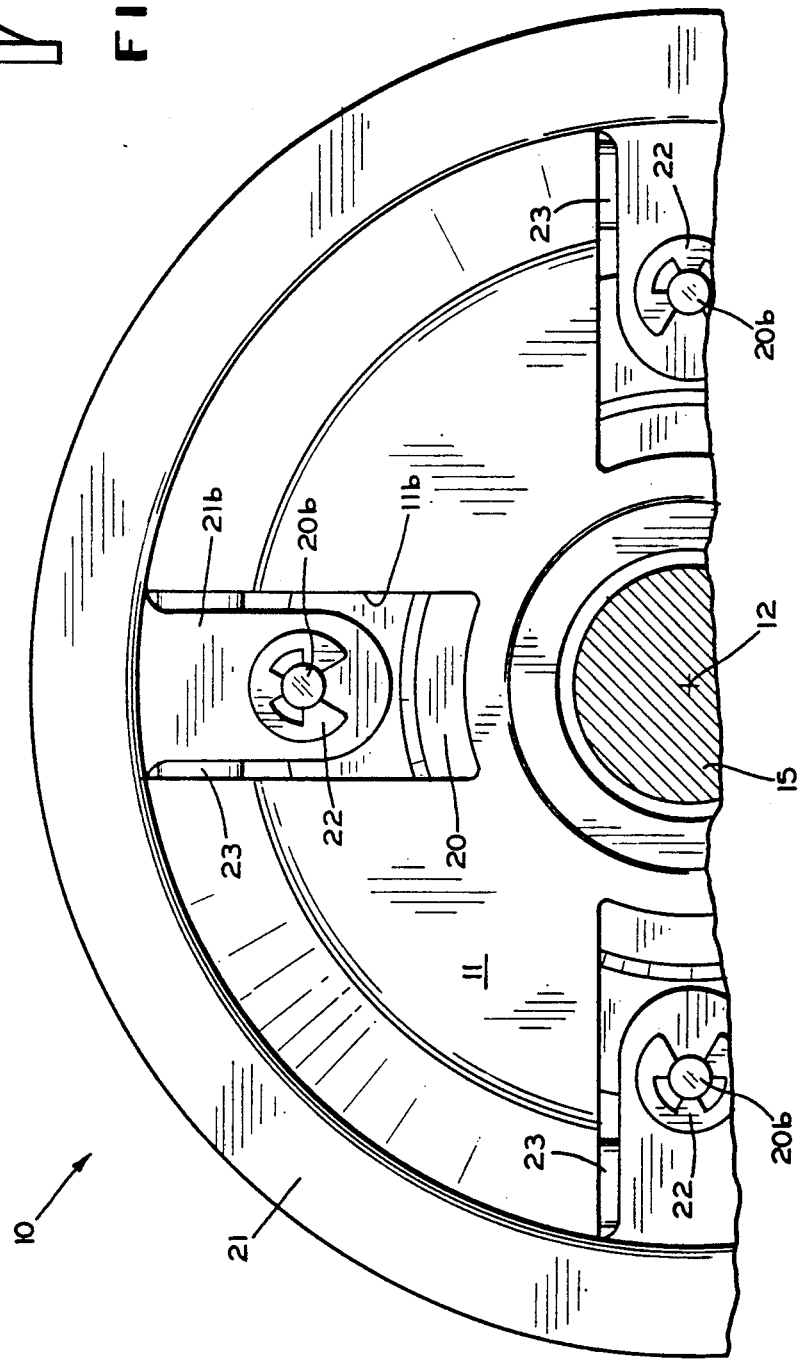
FIG. 2 is an end elevational view of the portion of the differential illustrated in FIG. 1.

Referring now to the drawings, there is illustrated in FIGS. 1 and 2 a portion of a selectively lockable vehicle differential, indicated generally at 10, in accordance with this invention. The differential 10 includes a case 11 which is adapted to be rotatably supported within an axle housing (not shown) in a known manner. The case 11 includes a circumferentially extending flange portion having a plurality of apertures 11a formed therethrough. The apertures 11a are provided to secure a ring gear (not shown) to the case 11. The ring gear meshes with other components of the drive train of the vehicle so as to rotate the case 11 about an axis 12 within the axle housing.

A pair of side gears 13 and 14 are disposed within the case 11 for rotation about the axis 12. Respective thrust washers 13a and 14a are disposed between the side gears 13 and 14 and the case 11. The side gears 13 and 14 are splined onto respective axle shafts 15 and 16 which extend axially outwardly from the case 11. A cross shaft 17 extends through the case 11 between the side gears 13 and 14, transversely to the axis 12. The ends of the cross shaft 17 are received in respective aligned apertures formed through the case 11. A retaining pin (not shown) or similar conventional retaining means is provided for retaining the cross shaft 17 within the case 11. A pair of pinion gears 18 (only one is illustrated) is rotatably mounted on the ends of the cross shaft 17. The pinion gears 18 mesh with the side gears 13 and 14 in a known manner to form the basic structure of the differential 10.

One of the side gears 13 is formed having one or more axially outwardly facing dog teeth 13a located adjacent to a machined cylindrical surface 13b. A generally annular locking collar 20 is journalled on this cylindrical surface 13b for axial sliding movement thereon. The locking collar 20 has a corresponding number of axially inwardly facing dog teeth 20a formed thereon. When the locking collar 20 is located in the posotion illustrated in FIG. 1, the locking collar teeth 20a engage the side gear teeth 13a. As will be explained in greater detail below, this is the locked position of the locking collar 20, wherein the differential 10 is locked to prevent speed differentiation between the two side gears 13 and 14 and, consequently, the two axle shafts 15 and 16. When the locking collar 20 is moved to the left from the position illustrated in FIG. 1, the locking collar teeth 20a are disengaged from the side gear teeth 13a, thus unlocking the differential 10 to permit such speed differentiation. It will be appreciated that the teeth 13a and 20a may be replaced by respective splined portions formed on the side gear 13 and the locking collar 20.

A shifting collar 21 is provided for selectively moving the locking collar 20 between the locked and unlocked positions. The shifting collar 21 includes an outer annular yoke portion 21a and a plurality of radially inwardly extending spoke portions 21b. The spoke portions 21b extend through respective slots 11b formed through the case 11 and terminate in end portions having apertures 21c formed therethrough. Respective axially extending boss portions 20b are formed on the locking collar 20 and extend through the apertures 21c. The exposed ends of the boss portions 20b have annular grooves (not shown) formed thereon. A retaining clip 22 is installed on each of the ends of the boss portions 20b, extending into the grooves. The retaining clips 22 connect the spoke portions 21b to the boss portions 20b such that the shifting collar 21 and the locking collar 20 move as a unit. Any conventional means (not shown) may be provided for engaging the yoke portion 21a of the shifting collar 21 to effect axial movement thereof between the locked and unlocked positions.

Because the spoke portions 21b extend through the respective slots 11b formed in the case 11, the shifting collar 21 and the locking collar 20 both rotate with the case 11. When the shifting collar 21 and the locking collar 20 are moved to the locked position illustrated in FIG. 1, the side gear 13 is connected thereto by the engagement of the teeth 13a and 20a. Thus, the side gear 13 is constrained to rotate in unison with the case 11. As is well known, this results in the locking of the differential 10, whereby both axle shafts 15 and 16 rotate with the case 11. When the shifting collar 21 and the locking collar 20 are moved to the unlocked position, the axle shafts 15 and 16 are free to rotate relative to each other and to the case 11.

The differential case 11 is usually formed by casting. Because of this, the sizes and locations of the slots 11b are not usually formed to precise tolerances. As a result, the loads imposed on the spoke portions 21b may be unequally distributed, causing undesirable wear. To prevent this from occurring, while still permitting the case 11 to be formed economically by casting, a bearing means is disposed in each of the slots 11b formed through the case 11. The bearing means are provided for engaging and guiding the said spoke portions 21b as they are moved axially between the locked and unlocked positions. Each of the bearing means is a generally U-shaped clip 23 having flange portions 23a which are frictionally secured to the case 11 within each of the slots 11b. The clips 23 are preferably formed from a relatively hard, but somewhat resilient material, such as plastic or glass-filled nylon. However, metal or similar materials may also be used. The clips 23 are engaged by the spoke portions 21b as they move axially. As such movement occurs, the surfaces of the clips 23 wear and become slightly deformed. This wear causes the load on the spoke portions 21b to be distributed relatively equally.

Figure 3:
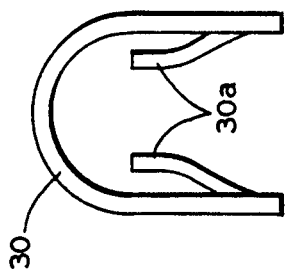
FIG. 3 is a plan view of an alternate embodiment of the bearing clip illustrated in FIGS. 1 and 2.

FIG. 3 illustrates a spring clip 30 which can be substituted for the clip 23. The spring clip 30 is formed having a pair of inwardly extending resilient arm portions 30a which engage the sides of spoke portion 21b. The resilient arm portions 30a function to position and guide the spoke portions 21b for movement as described above. The spring clip 30 can also be formed from the same materials as described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A lockable differential comprising:
   a hollow rotatable case having an opening formed therethrough;
   a cross shaft extending through siad case for rotation therewith;
   a pair of pinion gears carried on siad cross sahft for toation relative thereto;
   a pair of side gears supported within said case for rotation relative to siad case, siad side gears meshing with siad pinion gears, one of siad gears having a locking tooth formed thereof;
   a clutch member diposed within said case having a locking tooth formed thereon;
   a spoke extendign outwardly from siad clutch member through said case opening for effecting movmeent of said clutch member between a locked postiion, wherein siad clutch member locking tooth is engaged with siad side gear locking tooth to preent relative rotation between said side gear and siad case, and an unlocked position, wherein siad clutch member locking tooth is not engaged with siad side gear locking tooth to permit relative rotation between siad sidde gear and siad case; and
   bearing means disosed in soad opening formed through siad case for engaging and guiding siad spoke as it is moved between siad locked and unlocked positions, said bearing measn comrising a gneerally U-shaped clip.

2. A locking differential as set forth in claim 1 wherein siad generally U-shaped clip is provided with flange portions which frictionally secure siad clip to siad case.

3. A locking differential as set forth in claim 1 wherein siad generally U-shaped clip is formed from a plastic material.

4. A locking differential as set forth in claim 1 wherein siad generally U-shaped clip is formed from a glass filled nylon material.

5. A locking differentail as set forth in claim 1 wherein siad generlaly U-shaped clip is formed having a pair of resilient arm portions which engage side portions of said spokes.

6. A locking differentail as set forth in claim 5 wherein siad generlaly U-shaped clip is provided with flange portions which frictionally secure siad clip to siad case.

7. A locking differential as set forth in claim 5 wherein siad generlaly U-shaped clip is formed from a plastic material.

8. A locking differentail as set forth in claim 5 wherein siad generlaly U-shaped clip is formed from a glass filled nylon material.

9. A locking differential as set forth in claim 1 wherein a plurlaity of openings are formed through said case.

10. A locking differential as set forht in claim 9 wherein a plurality of spokes are provided, each of said spokes extending outwardly from siad clutch member through respective ones of said openings.

11. A locking differential as set forth in claim 10 wherein resepctive bearing means are disposed in said openings formed through said case for engagings and guiding said spokes as they are moved between siad locked and unlocked positions, each of siad bearing means compirsing a generally U-shaped clip.

* * * * *

UNITED STATES PATENT AND TRADEMARK OFFICE
CERTIFICATE OF CORRECTION

PATENT NO. : 5,171,192                                         Page 1 of 3

DATED : December 15, 1992

INVENTOR(S) : Kraig J. Schlosser and Howard W. Reaser

It is certified that error appears in the above-identified patent and that said Letters Patent is hereby corrected as shown below:

Column 4,
Claims 1 through 11 should be written as follows:

1. A lockable differential comprising:
a hollow rotatable case having an opening formed therethrough;
a cross shaft extending through said case for rotation therewith;
a pair of pinion gears carried on said cross shaft for rotation relative thereto;
a pair of side gears supported within said case for rotation relative to said case, said side gears meshing with said pinion gears, one of said side gears having a locking tooth formed thereon;
a clutch member disposed within said case having a locking tooth formed thereon;
a spoke extending outwardly from said clutch member through said case opening for effecting movement of said clutch member between a locked position, wherein said clutch member locking tooth is engaged with said side gear locking tooth to prevent relative rotation between said side gear and said case, and an unlocked position, wherein said clutch member locking tooth is not engaged with said side gear locking tooth to permit relative rotation between said side gear and said case; and
bearing means disposed in said opening formed through said case for engaging and guiding said spoke as it is moved between said locked and unlocked positions, said bearing means comprising a generally U-shaped clip.

UNITED STATES PATENT AND TRADEMARK OFFICE
CERTIFICATE OF CORRECTION

PATENT NO. : 5,171,192

DATED : December 15, 1992

INVENTOR(S) : Kraig J. Schlosser and Howard W. Reaser

It is certified that error appears in the above-identified patent and that said Letters Patent is hereby corrected as shown below:

A locking differential as set forth in Claim 1 wherein said generally U-shaped clip is provided with flange portions which frictionally secure said clip to said case.

A locking differential as set forth in Claim 1 wherein said generally U-shaped clip is formed from a plastic material.

A locking differential as set forth in Claim 1 wherein said generally U-shaped clip is formed from a glass filled nylon material.

A locking differential as set forth in Claim 1 wherein said generally U-shaped clip is formed having a pair of resilient arm portions which engage side portions of said spokes.

A locking differential as set forth in Claim 5 wherein said generally U-shaped clip is provided with flange portions which frictionally secure said clip to said case.

A locking differential as set forth in Claim 5 wherein said generally U-shaped clip is formed from a plastic material.

UNITED STATES PATENT AND TRADEMARK OFFICE
CERTIFICATE OF CORRECTION

PATENT NO. : 5,171,192

DATED : December 15, 1992

INVENTOR(S) : Kraig J. Schlosser and Howard W. Reaser

It is certified that error appears in the above-identified patent and that said Letters Patent is hereby corrected as shown below:

A locking differential as set forth in Claim 5 wherein said generally U-shaped clip is formed from a glass filled nylon material.

A locking differential as set forth in Claim 1 wherein a plurality of openings are formed through said case.

A locking differential as set forth in Claim 9 wherein a plurality of spokes are provided, each of said spokes extending outwardly from said clutch member through respective ones of said openings.

A locking differential as set forth in Claim 10 wherein respective bearing means are disposed in said openings formed through said case for engagings and guiding said spokes as they are moved between said locked and unlocked positions, each of said bearing means comprising a generally U-shaped clip.

Signed and Sealed this

Twenty-sixth Day of October, 1993

Attest:

BRUCE LEHMAN

*Attesting Officer*　　　　*Commissioner of Patents and Trademarks*